United States Patent
Cowley et al.

(10) Patent No.: US 9,225,559 B2
(45) Date of Patent: Dec. 29, 2015

(54) APPARATUS AND METHOD TO PROCESS SIGNALS FROM ONE OR MORE TRANSMISSION SOURCES

(75) Inventors: Nicholas Cowley, Wroughton (GB); Isaac Ali, Bristol (GB)

(73) Assignee: INTEL CORPORATION, Santa Clara, CA (US)

( * ) Notice: Subject to any disclaimer, the term of this patent is extended or adjusted under 35 U.S.C. 154(b) by 65 days.

(21) Appl. No.: 12/924,343

(22) Filed: Sep. 24, 2010

(65) Prior Publication Data

US 2012/0076191 A1    Mar. 29, 2012

(51) Int. Cl.
*H03K 9/00*    (2006.01)
*H04B 1/10*    (2006.01)
*H04L 25/03*    (2006.01)

(52) U.S. Cl.
CPC ................................. *H04L 25/03012* (2013.01)

(58) Field of Classification Search
USPC .................... 375/211, 219, 229–236, 240.02, 375/240.04–240.07, 240.26–240.29, 316, 375/347, 345, 344, 350, 220, 222, 285, 284, 375/278, 295, 299, 318, 324, 346, 348, 349, 375/340, 354, 356, 362
See application file for complete search history.

(56) References Cited

U.S. PATENT DOCUMENTS

| | | | | |
|---|---|---|---|---|
| 5,886,573 | A  * | 3/1999 | Kolanek | 330/10 |
| 7,391,829 | B2 * | 6/2008 | Tripathi et al. | 375/345 |
| 2002/0027958 | A1 * | 3/2002 | Kolanek | 375/297 |
| 2002/0150185 | A1 | 10/2002 | Meehan et al. | |
| 2005/0285720 | A1 * | 12/2005 | Cope et al. | 340/310.13 |
| 2006/0083202 | A1 * | 4/2006 | Kent et al. | 370/334 |
| 2007/0082642 | A1 * | 4/2007 | Hattori | 455/286 |
| 2007/0167188 | A1 * | 7/2007 | Linden | 455/552.1 |
| 2007/0230640 | A1 * | 10/2007 | Bryan et al. | 375/349 |
| 2009/0086806 | A1 * | 4/2009 | Hwang et al. | 375/232 |
| 2009/0212867 | A1 * | 8/2009 | Fukuzawa et al. | 330/284 |
| 2010/0040082 | A1 * | 2/2010 | Raveendran | 370/464 |
| 2010/0309893 | A1 * | 12/2010 | Zhu et al. | 370/338 |

FOREIGN PATENT DOCUMENTS

WO    WO2006115319    11/2006

* cited by examiner

*Primary Examiner* — Linda Wong
(74) *Attorney, Agent, or Firm* — Kacvinsky Daisak Bluni PLLC

(57) ABSTRACT

A receiver and a method to process signals from one or more transmission sources. The receives includes a front-end having: an input coupling path to route an analog input signal received from one or more transmission sources; an equalizer to generate an equalized signal from the analog input signal; and an ADC to generate a digitized signal from the equalized signal. The method includes routing the analog input signal through an input coupling path; equalizing the analog input signal to generate an equalized signal therefrom; and digitizing the equalized signal to generate a digitized signal therefrom.

15 Claims, 3 Drawing Sheets

APPARATUS AND METHOD TO PROCESS SIGNALS FROM ONE OR MORE TRANSMISSION SOURCES

FIELD

The subject matter disclosed herein relates to apparatuses and methods to receive signal transmissions from distribution media or transmission sources, such as, for example, cable, terrestrial and satellite.

BACKGROUND

Currently, in order to receive and process signal transmissions from differing distribution media, such as, for example, distribution media within wireless communication systems, different corresponding receiver paths and architectures are needed. The above disadvantageously leads to unnecessarily high costs and complexity associated with the reception of input signals from more than one source.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
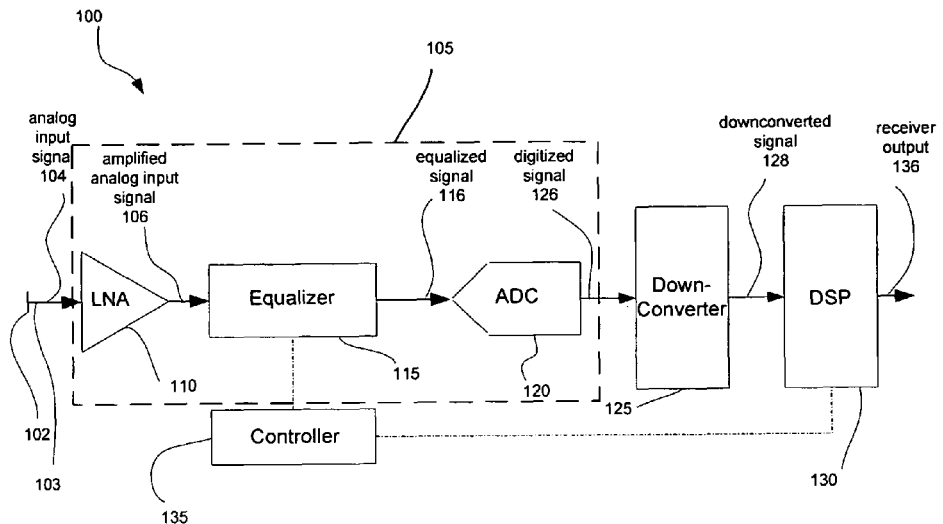
FIG. 1 depicts a portion of a receiver architecture according to a first embodiment.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

A receiver according to embodiments provides a unique combination of functional blocks that advantageously allows the implementation of a front end to receive transmission signals from various transmission sources or distribution media, such as, for example, cable, terrestrial and satellite. The receiver may then be configured to output multiple independent output signals, such as, for example, channels, from a common transmission source, or from various distinct transmission sources. A receiver according to some embodiments may be well configured to the digital television space, although embodiments are not so limited.

A method according to embodiments allows a universal demodulation of transmission signals from various transmission sources in order to make possible the output of multiple independent output signals therefrom. The method may allow a demodulation of those transmission signals from a common transmission source, or from various distinct transmission sources.

Referring now to FIGS. 1-4, exemplary embodiments for a receiver will be described. Like elements will be referred to by like reference numerals in the attached figures.

Referring first to FIG. 1, a receiver 100 is shown according to a first embodiment. Receiver 100 has a front-end 105 which may include a low-noise amplifier (LNA) 110 to receive an analog input signal 104 from an antenna 102, the analog input signal 104 being routed through an input coupling path 103 of the front end. The front end may also include an equalizer 115 coupled to LNA 110, and an analog-to-digital converter (ADC) 120 coupled to the equalizer. A controller 135 may also be coupled to the equalizer.

Variable gain low noise amplifier LNA 110 may be a conventional LNA that sets the receive sensitivity of the receiver by offering high gain and by reducing the noise in the signal being received, in this case, an analog input signal as shown, in this way generating an amplified analog input signal 106. The analog input signal could be a signal transmitted through a wireless medium such as a cable, terrestrial or satellite transmission source, and could include, for example, a (radio frequency) RF signal. The analog input signal may include a broad-band signal, that is, a composite signal containing multiple independent signals each occupying a different part of the total received spectrum. According to one embodiment, front end 105 may operate at a band from about 50 MHz up to about 1 GHz to support cable and terrestrial transmissions.

Equalizer 115 is shown in FIG. 1 as being coupled to the LNA 110 to receive the amplified analog input signal 106 and to generate an equalized signal 116 therefrom. According to one embodiment, equalizer 115 may be configured to compensate for the amplitude-frequency response of the input signal 106 at the front end by changing a gain of the same in a conventional manner. For example, if the front end input signal has a roll-off at 500 MHz, the equalizer applies an equal and opposite gain to the signal in order to compensate for the roll-off. According to an embodiment, if other components within the receiver are configured to process a signal within a given frequency range, the equalizer may alter the frequency response of the input signal based on the frequency range to be processed by these components within the receiver, as would be recognized by a person skilled in the art, to generate equalized signal 116. In general, whatever variations the input signal 106 presents with respect to a frequency response to be processed within the receiver, the equalizer may change the gain of the input signal to compensate for such variation. Preferably, equalizer 115 may be programmable to provide optimized equalization based on various spectral sources used for the analog input signals being received.

ADC 120 is shown in FIG. 1 as being coupled to equalizer 115 to receive the equalized signal 116 and to generate a digitized signal 126 therefrom in a conventional manner. The ADC may for example be configured to digitize a complete spectrum corresponding to the equalized signal and to thereby give access to any data streams within the spectrum.

Referring to still to FIG. 1, receiver 100 may also include a digital signal processor (DSP) 130 coupled to ADC 120 to further process the digitized signal 116. A digital downconverter (DDC) 125 may additionally be provided between the ADC 120 and DSP 130 to generate a downconverted signal 128 from the digitized signal 126. The DSP may be configured to receive the downconverted signal 128 to generate an output signal 136 in a conventional manner by performing a frequency demodulation function, such as for example to provide forward error correction where and if necessary. In addition to providing a demodulation function, the DSP may be configured to perform an amplitude scan of the analog input signal, such as an amplitude scan across the amplified analog input signal 106. Such amplitude detection as a function of frequency of the amplified analog input signal 106 may be useful in setting a coefficient characteristic of the equalizer 115 through a controller 135 as will be explained below.

Thus, according to an embodiment, as shown in FIG. 1, receiver 100 may also include controller 135 as shown, the controller being coupled to the equalizer 115 and to the DSP 130. Controller 135 may receive information regarding the amplitude detection scan from the DSP 130, and may be configured to set the coefficient characteristics of the equalizer 115 based on the amplitude detection signal. For example, if the roll-off of the amplified input signal 106 is at 500 MHz, an amplitude detection scan by the DSP can detect such roll-off and send information regarding the same to controller 135, which may, based on the roll-off information from DSP 130, set the equalizer gain.

Figure 2:
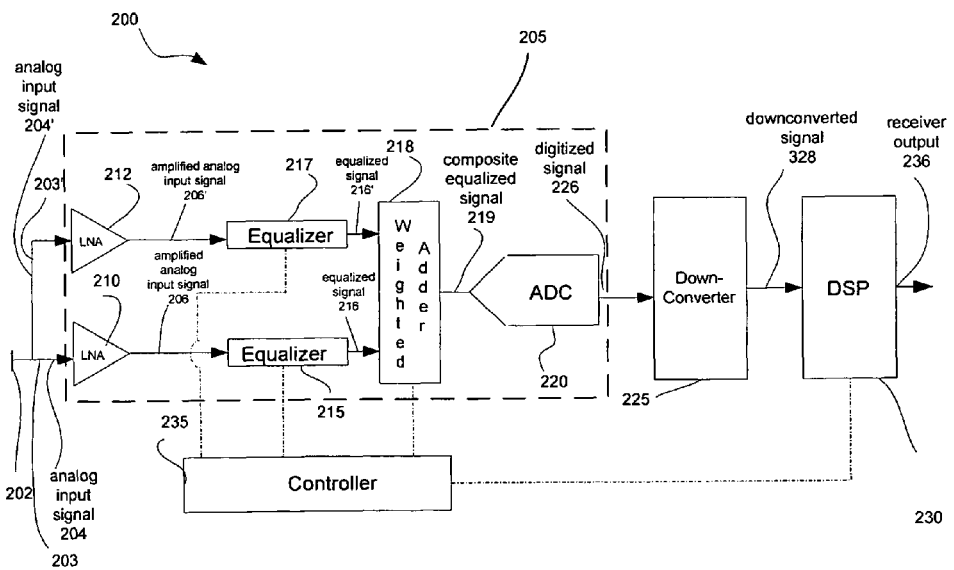
FIG. 2 depicts a portion of a receiver architecture according to a second embodiment.
Figures 3, 4:
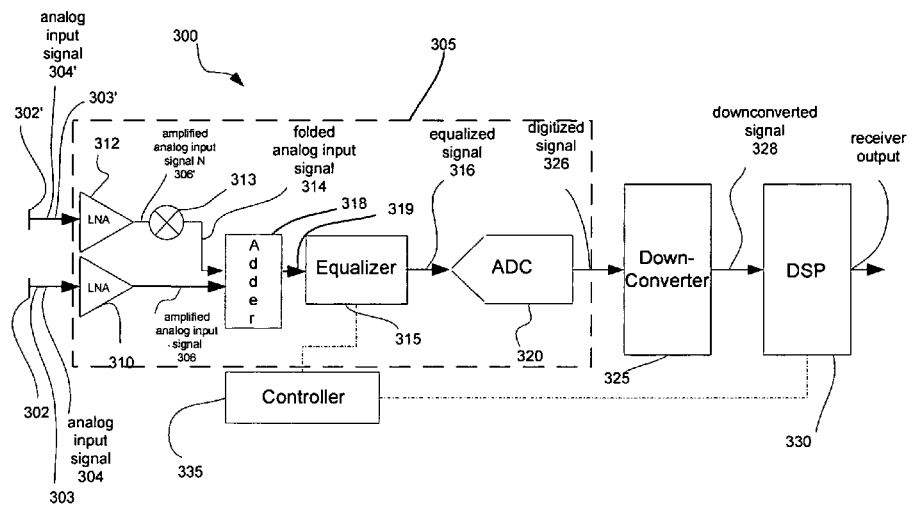
FIG. 3 depicts a portion of a receiver architecture according to a third embodiment.
FIG. 4 depicts a portion of a receiver architecture according to a fourth embodiment.

Referring now to FIGS. 2-4, some embodiments include receivers configured to receive and process a plurality of analog input signals received through respective input coupling paths. While FIG. 2 depicts a receiver having a plurality of parallel input coupling paths configured to route respective analog input signals from a single transmission source therethrough, FIGS. 3 and 4 depict a receiver having a plurality of input coupling paths configured to route corresponding analog input signals from respective distinct transmission sources therethrough. The embodiments of FIGS. 2-4 will be described in detail below.

Referring now to FIG. 2, a receiver 200 is similar to receiver 100 of FIG. 1 is shown having like components referred to with like reference numerals. A difference between the embodiment of FIG. 2 as compared with that of FIG. 1 is that the embodiment of FIG. 2 includes a plurality of parallel input coupling paths 203 and 203', where respective analog input signals 204 and 204' are derived from a single transmission source, such as a single RF source transmitting to antenna 202. Each of the input coupling paths 203 and 203' may be coupled to a respective LNA's 210 and 212 to route respective ones of analog input signals 204 and 204' thereto. LNA's 210 and 212 may function in a manner similar to LNA 110 of FIG. 1 to generate respective amplified analog input signals 206 and 206'. Equalizers 215 and 217 are configured to convert respective ones of analog input signals 206 and 206' into corresponding equalized signals 216 and 216'. Advantageously, receiving a transmission at two differing input paths allows a simplification of equalizer design. For example, where a transmission from a single RF source is received at a single input path, and the transmission includes a broadband signal of multiple poles and zeros, equalizing such a transmission in single blocks may lead to complexities in equalizer design. However, if the broadband signal is split into zeros and poles when received at the front end, equalization may become much simpler. Front end 205 may also include an adder, such as weighted adder 218 that may be configured to add equalized signals 216 and 216' to generate a composite equalized signal 219 therefrom in a conventional manner.

Referring still to FIG. 2, front end 205 may additionally include an analog-to-digital converter (ADC) 220 coupled to adder 218 to receive composite equalized signal 219 and to convert the same into digitized signal 326. Receiver 200 may additionally include a digital signal processor (DSP) 230 coupled to ADC 220 to further process digitized signal 326 from the ADC. A digital downconverter (DDC) 225 may additionally be provided between the ADC and DSP to generate a downconverted signal 228 from the digitized signal 226 in a conventional manner. The DSP may be configured to process the downconverted signal 228 to generate an output signal 236 of receiver 200 also in a conventional manner by performing a frequency demodulation function, such as for example to provide forward error correction where and if necessary. In addition to providing a demodulation function, the DSP may be configured to perform an amplitude scan of the analog input signals, such as an amplitude scan across the amplified analog input signals 206 and 206'. Thus, DSP 230 may collaborate with controller 235 to set a coefficient characteristic of equalizers 215 and 217 using information from an amplitude scan across the analog input signals.

Referring now to FIGS. 3 and 4, some embodiments include receivers configured to receive and process a plurality of analog input signals from respective distinct transmission sources and received through respective input coupling paths as will be described in greater detail below.

In FIG. 3, a receiver 300 similar to receiver 100 of FIG. 1 is shown having like components referred to with like reference numerals. A difference between the embodiment of FIG. 3 as compared with that of FIG. 1 is that the embodiment of FIG. 3 includes a plurality of input coupling paths 303 and 303', where corresponding analog input signals 304 and 304' are derived from respective distinct transmission sources, such as a plurality of RF sources transmitting to antennas 302 and 302', respectively. In the shown embodiment, analog input signal 304' may have a frequency that is different from, such as, for example, higher than, a frequency of analog input signal 304. For example, analog input signal 304' may include a MoCA transmission at a higher frequency than a frequency of analog input signal 304 from a cable transmission. Each of the input coupling paths 303 and 303' may be coupled to a respective LNA 310 and 312 to route respective ones of analog input signals 304 and 304' thereto. LNA's 310 and 312 may function in a manner similar to LNA 110 of FIG. 1 to generate respective amplified analog input signals 306 and 306'. In the shown embodiment of FIG. 3, front end 305 may further include a frequency folding device or mixer 313 that may be coupled upstream of the equalizers to receive amplified analog input signal 306' from LNA 312 and configured to fold the same thereby generating a folded analog input signal 314 abutting amplified analog input signal 306. For example, folding device 313 may optimize a signal amplitude of the higher frequency signal, or amplified analog input signal 306', based on amplitude limitations of ADC 320. Again by way of example, the frequency folding device may perform block frequency conversion by mixing a 950-2150 MHz block with 2200 MHz, arriving in this way at its output with a folded analog input signal which may include a mixture of signals between about 50 MHz and about 1250 MHz. The use of a mixer may advantageously allow satellite transmissions to be received in the same front end. Extending front end 105 to include a mixer would allow support of higher frequency transmission by a receiver according to some embodiments, such as support of Multimedia over Coax Alliance (MoCA) transmissions. As shown in FIG. 3, the folded analog input signal 314 and the amplified analog input signal 306 may be added together using an adder 318, such as, for example a basic adder maintaining unity gain, or a weighted adder, depending on system requirements. Equalizer 315 may be configured to convert composite signal 319 obtained by adding signals 306 and 314 into a corresponding equalized signal 316 in a manner similar to equalizer 115 of FIG. 1 described above.

Front end 305 may additionally include an analog-to-digital converter (ADC) 320 coupled to the equalizer to receive equalized signal 316 and to convert the same into digitized signal 326. Receiver 300 may additionally include a digital signal processor (DSP) 330 coupled to ADC 320 to further process digitized signal 326 from the ADC. A digital downconverter (DDC) 325 may additionally be provided between the ADC and DSP to generate a downconverted signal 328 from the digitized signal 326 in a conventional manner. The DSP may be configured to process the downconverted signal 328 to generate an output signal 336 of receiver 300 also in a conventional manner by performing a frequency demodulation function, such as for example to provide forward error correction where and if necessary. In addition to providing a demodulation function, the DSP may be configured to perform an amplitude scan of the analog input signal, such as an amplitude scan across the analog input signals 306 and 314. Thus, DSP 330 may collaborate with controller 335 to set a coefficient characteristic of equalizer 315, causing information from an amplitude scan across the analog input signals.

Referring next to FIG. 4, a fourth embodiment is shown combining features from the embodiments of FIGS. 2 and 3 respectively. Thus, in FIG. 4, a plurality of input coupling paths are provided to route respective analog input signals, some but not all of the analog input signals being from a common transmission source. In this way, FIG. 4 combines the parallel analog inputs of FIG. 2 with the frequency folding device of FIG. 3. More particularly, FIG. 4 shows a plurality of parallel input coupling paths 403, 403' and 403", where respective analog input signals 404 and 404' may be derived from a single transmission source, such as a single RF cable source configured to transmit to antenna 402, while input signal 404" may be derived from a RF source that is different/distinct from the RF source for parallel input coupling paths 403 and 403', the RF source for input signal 404"being configured to transmit to antenna 402'. Advantageously, as noted previously, receiving a transmission at two differing input paths, such as paths 403, 403' and 403", allows a simplification of equalizer design. For example, where a transmission from a single RF source is received at a single input path, and the transmission includes a broadband signal of multiple poles and zeros, equalizing such a transmission in single blocks leads to complexities in equalizer design. However, if the broadband signal is split into zeros and other poles when received at the front end, equalization becomes much simpler. In the shown embodiment, analog input signal 404" may have a frequency that is different from, such as, for example, higher than, a frequency of analog input signal 404 or 404'. For example, analog input signal 404" may include a MoCA transmission at a higher frequency than a frequency of analog input signals 404 or 404', which may be derived from a cable transmission. Each of the input coupling paths 403, 403' may be coupled to a respective LNA's 410 and 411 to route respective ones of analog input signals 404 and 404' thereto. LNA's 410 and 411 may function in a manner similar to LNA's 210 and 212 of FIG. 2 to generate respective amplified analog input signals 406 and 406'. LNA 412 may function in a manner similar to LNA 312 of FIG. 3 to generate amplified analog input signal 406".

Referring still to FIG. 4, front end 405 further includes a frequency folding device or mixer 413 that may be coupled to receive amplified analog input signal 406" from LNA 412 and configured to fold the same thereby generating a folded analog input signal 414 abutting amplified analog input signal 406'. For example, folding device 413 may optimize a signal amplitude of the higher frequency signal, or amplified analog input signal 406", based on amplitude limitations of ADC 420. Again by way of example, the frequency folding device may perform block frequency conversion by mixing a 950-2150 MHz block with 2200 MHz, arriving in this way at its output with a folded analog input signal which may include a mixture of signals between about 50 MHz and about 1250 MHz.

Equalizers 415 and 417 of FIG. 4 may be configured to convert respective ones of analog input signal 406 on the one hand, and analog input signal 406' along with folded signal 414 on the other hand, into corresponding equalized signals 416 and 416'. Thus, equalizer 415 may function similarly to equalizer 215 of FIG. 2, while equalizer 417 may function similarly to equalizer 217 of FIG. 2 and to equalizer 315 of FIG. 3.

Referring still to FIG. 4, front end 405 may also include an adder, such as weighted adder 418 that may be configured, similar to adder 218 of FIG. 2, to add equalized signals 416 and 416' to generate a composite equalized signal 419 therefrom. Front end 405 may additionally include an analog-to-digital converter (ADC) 420 coupled to the equalizer to receive composite equalized signal 419 and to convert the same into digitized signal 426. Receiver 400 may additionally include a digital signal processor (DSP) 430 coupled to ADC 420 to further process digitized signal 326 from the ADC. A digital downconverter (DDC) 425 may additionally be provided between the ADC and DSP to generate a downconverted signal 428 from the digitized signal 426 in a conventional manner. The DSP may be configured to process the downconverted signal 428 to generate an output signal 436 of receiver 400 also in a conventional manner by performing a frequency demodulation function, such as for example to provide forward error correction where and if necessary. In addition to providing a demodulation function, the DSP may be configured to perform an amplitude scan of the analog input signal, such as an amplitude scan across the amplified analog input signals 406, 406' and 406". Thus, DSP 430 may collaborate with controller 235 to set a coefficient characteristic of equalizers 415 and 417 using information from an amplitude scan across the analog input signals.

As shown for example in FIGS. 2 and/or 4, according to some embodiments, the front end of a receiver may include a number of parallel input paths the signals of which are summed, in which case equalization may take place individually with respect to each input path. Additionally, as shown for example in FIG. 4, a receiver according to an embodiment may be configured to receive analog input signals derived from a plurality of distinct transmission sources coupled to one or more of the parallel input paths. Moreover, one or more of the parallel input paths could involve frequency folding where input signals from a plurality of transmission sources are involved. Equalization according to embodiments may be achieved by storing equalization coefficients based on different transmission sources being contemplated for the receiver and/or based on different frequency characteristics of the receiver.

It is noted that, although various components within a receiver according to the described embodiments may have been described as being configured to process a certain type of signal, such as, for example, the ADC digitizing an equalized signal from the equalizer, embodiments contemplate within their scope instances where the signal to be processed may have been further processed by an intervening component. Thus, in the given example, the equalized signal may have been processed by one or more intervening components such as one or more filters before being digitized by the ADC, and the present description would still be applicable to that instance. In addition, although some architecture embodiments have been shown in FIGS. 1-4, for example, embodiments contemplate various other arrangements of the different components described herein, such as, for example, the provision of mixers upstream of amplifiers, the provision of even more input paths and equalizers combined with mixers and adders based on system requirements, or the provision of a mixer on a single input path associated with a single transmission source.

Figure 5:
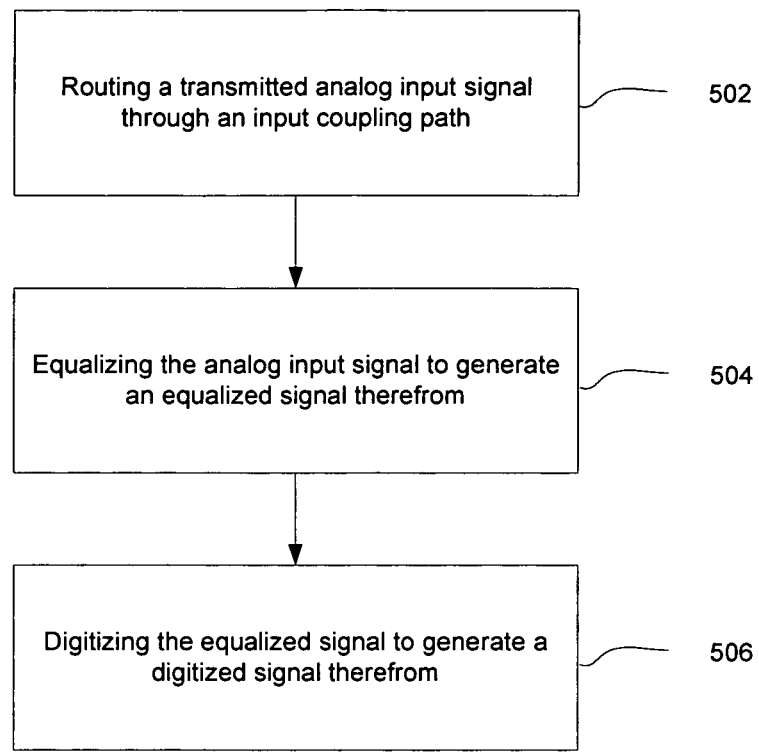
FIG. 5 depicts a process according to one embodiment.

FIG. 5 depicts a process that can be used in according with some embodiments.

Block 502 may include routing a transmitted analog input signal through an input coupling path. For example, the analog in put signal may be a broadband signal from an RF source such as a cable or terrestrial source. Block 504 may include equalizing the analog in put signal to generate an equalized signal therefrom. For example, a broadband RF analog input signal may be equalized by selecting a predetermined frequency band from that input signal. Block 506 may include digitizing the equalized signal to generate a digitized signal therefrom. According to some embodiments, more than one analog input signals may be routed and equalized, either from a single transmission source through parallel input paths, or from a plurality of distinct transmission sources through corresponding input paths.

Figure 6:
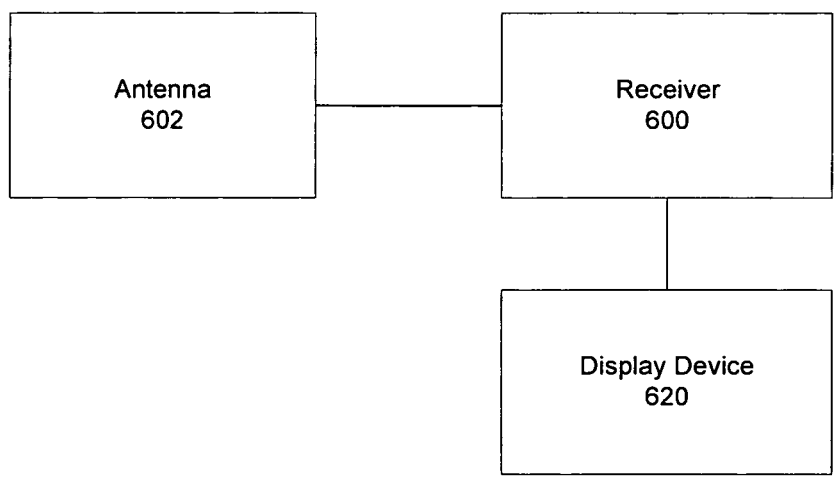
FIG. 6 depicts a system including a receiver architecture according to one embodiments.

FIG. 6 depicts a system that can be used in embodiments. For example, a television signal receiver 600 may be part of a system according to embodiments. Television signal receiver 600 may be capable to receive RF television signals transmitted through a wireless medium using an antenna 610 and radio logic in according with relevant standards such as but not limited to A/74 and ATSC. Signals may be provided to display device 620 using any format or interface. Display device 620 may display images or video based on the decoded signals. Display device 620 may be implemented as a television or display monitor such as a computer monitor. In some embodiments, television signal receiver 600 may provide received signals to a computer that includes a processor and memory device. The processor may be capable to decode received signals in accordance with relevant standards.

Advantageously, according to embodiments, a combination of analog equalization with digitization allows a processing of input signals across a wide spectrum while allowing the power per rt Hz across the received bandwidth to be normalized as far as possible within bounds of the equalization power. The above enables the effective number of bits (ENOB) from digitization to be reduced compared to a situation where no equalization takes place, in this way making embodiments more realizable. A combination of a DSP with a DDC and equalization further advantageously allows the implementation of a self-supporting equalization algorithm.

Embodiments are not limited for use in ATSC compliant systems and can be used in any system, whether part of a wireless or wireline receiver.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A receiver comprising a front-end, the front end including:
    a plurality of input coupling paths to route a corresponding plurality of analog input signals received from one or more transmission sources;
    a plurality of low-noise amplifiers (LNAs) to generate a plurality of amplified analog input signals from the plurality of analog input signals, each of the plurality of LNAs coupled to at least one of the plurality of input coupling paths;
a plurality of equalizers to generate a plurality of equalized signals from the plurality of amplified analog input signals, each of the plurality of equalizers coupled to at least one of the plurality of input coupling paths and at least one of the plurality of LNAs;
a weighted adder coupled to each of the plurality of equalizers, the weighted adder to generate a composite equalized signal from the plurality of equalized signals;
an analog to digital converter (ADC) coupled to the weighted adder, the ADC to generate a digitized signal from the composite equalized signal; and
a digital signal processor (DSP) coupled to the ADC to receive the digitized signal therefrom, the DSP being adapted to demodulate the digitized signal.

2. The receiver of claim 1, wherein the equalizers are configured to compensate for frequency responses of the analog input signals by adjusting gains of the analog input signals to generate the equalized signals therefrom.

3. The receiver of claim 1, further comprising a controller coupled to the equalizers and to the DSP, wherein:
the DSP is configured to perform an amplitude scan of the analog input signals; and
the controller is configured to receive information from the DSP regarding the amplitude scan to set gain coefficients of the equalizers.

4. The receiver of claim 1, wherein the plurality of input coupling paths comprises a plurality of parallel input coupling paths.

5. The receiver of claim 1, wherein at least some of the input coupling paths are adapted to receive corresponding analog input signals from respective distinct transmission sources.

6. The receiver of claim 1, wherein:
at least one of the plurality of equalizers is coupled to a plurality of the input coupling paths including a first input coupling path to route a first analog input signal having a first frequency and a second input coupling path to route a second analog input signal having a second frequency different from the first frequency;
the front end further comprises a mixer coupled to the first input coupling path upstream of the equalizer to convert the first analog input signal to a folded analog input signal be centered at an intermediate frequency lower than the first frequency, the at least one of the plurality of equalizers to generate an equalized signal from the folded input signal abutting the second analog input signal.

7. The receiver of claim 6, further comprising a downconverter to generate a downconverted signal from the digitized signal.

8. A system, comprising:
the receiver of claim 1; and
one or more antennas, each of the one or more antennas coupled to at least one of the plurality of LNAs via at least one of the plurality of input coupling paths.

9. The system of claim 8, comprising a display device communicatively coupled to the receiver, the display device to display an image provided by content of the digitized signal.

10. A method of processing a plurality of analog input signals received from one or more transmission sources comprising:
performing operations in a receiver, the operations comprising:
routing the plurality of analog input signals through a corresponding plurality of input coupling paths;
amplifying each of the plurality of analog input signals to generate a plurality of amplified analog input signals therefrom using a plurality of low-noise amplifiers (LNAs), each of the plurality of LNAs coupled to at least one of the plurality of input coupling paths;
equalizing each of the plurality of amplified analog input signals to generate a plurality of equalized signals therefrom using a plurality of equalizers, each of the plurality of equalizers coupled to at least one of the plurality of input coupling paths and at least one of the plurality of LNAs;
generating a composite equalized signal from the plurality of equalized signals using a weighted adder coupled to each of the plurality of equalizers;
digitizing the composite equalized signal, by an analog to digital converter (ADC), to generate a digitized signal therefrom; and
demodulating the digitized signal.

11. The method of claim 10, the equalizing comprising compensating for frequency responses of the analog input signals by adjusting gains of the analog input signals to generate the equalized signals therefrom.

12. The method of claim 10, further comprising:
performing an amplitude scan of the analog input signals; and
using the amplitude scan to set gain coefficients of the equalizers to generate the equalized signals.

13. The method of claim 10, wherein the plurality of input coupling paths comprises a plurality of parallel input coupling paths.

14. The method of claim 10, wherein at least some of the input coupling paths are adapted to receive corresponding analog input signals from respective distinct transmission sources.

15. The method of claim 10, wherein:
at least one of the plurality of equalizers is coupled to a plurality of the input coupling paths including a first input coupling path to route a first analog input signal having a first frequency and a second input coupling path to route a second analog input signal having a second frequency different from the first frequency;
the method further comprises converting the first analog input signal to a folded analog input signal be centered at an intermediate frequency lower than the first frequency; and
equalizing further comprises using the at least one of the plurality of equalizers to generate an equalized signal from the folded analog input signal abutting the second analog input signal.

* * * * *